Patented Oct. 20, 1953

2,656,347

UNITED STATES PATENT OFFICE 2,656,347

STREPTOMYCIN BROTH CLARIFICATION WITH SEQUESTERING AGENTS

John J. Goett, New York, and Stanley W. Ensminger, Brooklyn, N. Y., assignors to Chas. Pfizer & Co., Inc., a corporation of Delaware No Drawing. Application August 25, 1949, Serial No. 112,407

6 Claims. (Cl. 260—210)

This invention relates to an improved process for recovering nitrogen basic antibiotic substances from aqueous solution. More particularly, it relates to an improved process for the recovery of streptomycin from harvested streptomycin-containing fermentation broths.

It is known that streptomycin is an elaboration product of the microorganism Actinomyces griseus, and that the antiobiotic substance is usually found associated with undesirable impurities which must be separated therefrom in order to obtain a therapeutically useful product. It is further known that the biologically active principle can be recovered from the harvested broth in a number of ways. In one procedure, the harvested broth is adjusted to pH 2.0 with hydrochloric acid, treated with carbon and filtered in order to obtain a clarified broth for further processing (J. Biol. Chem. 160, 337 (1945)). However, this treatment involves considerable loss of the valuable streptomycin. It has been further shown that harvested broth can be treated with dilute acid before filtration for further processing, and then filtered (U. S. Pat. 2,461,922) but this treatment fails to remove various substances, organic and inorganic, that interfere with subsequent purification procedures. The filtered streptomycin liquor obtained by these treatments can then be further processed by adsorption on carbon, followed by elution with an acidic solvent, by precipitation as an azo sulfonic acid dye salt, or by adsorption on cation-exchange materials and then elution with dilute acid. The relatively crude product obtained through these primary recoveries is further purified by chromatographic methods, by recrystallization of the reineckate, helianthate, etc., or by conversion to the streptomycin trihydrochloride-calcuim double salt.

When multivalent positive metallic ions are present in harvested fermentation broths as is usually the case, considerable difficulty has been experienced in connection with recovery processes ordinarily employed in purifying and separating antibiotics, such as streptomycin, streptothricin, neomycin and the like, since the recovery of the therapeutically active antibiotic e. g. streptomycin is relatively incomplete, and the amount of precipitating agent and absorbing agent used in further isolation procedures and in the recovery processes is considerably greater than is economically desirable. These multivalent positive metallic ions have a tendency to form precipitates upon clarification of the broth, requiring additional filtration steps. Furthermore, they may adsorb or co-precipitate the active antibiotic agent resulting in loss of antibiotic activity and requiring additional processing to recover the antibiotic. For example, calcium or magnesium ions may incidentally be precipitated as the stearate or oleate, and more particularly in the case of calcium ion, this ion may be precipitated as calcium phosphate. The presence of these precipitates during the recovery process, if they are not removed, may cause difficult filtration of an insoluble streptomycin dye salt formed during a subsequent step in the recovery process. They may also clog the resin bed during a recovery process wherein streptomycin is adsorbed on a cation-exchange resin, or they may effect a stoppage in the extraction apparatus employed in connection with chloramphenicol extraction.

Furthermore, it is known that calcium, magnesium and heavy metal ions co-precipitate with orange II when this reagent is used as a precipitating agent in a streptomycin purification process, thereby contaminating the precipitate and appearing in subsequent solutions to cause additional purification difficulties. These ions also compete with streptomycin in an adsorption process employing anion exchange resins, and they reduce the capacity of the resin for adsorbing streptomycin and appear in the eluate again to cause further difficulty in the purification processes.

An object of this invention is to provide a process for increasing the recovery yield of streptomycin from aqueous solutions as in harvested fermentation broths. A further object is to provide a process in which increased recovery of streptomycin from harvested fermentation broths is obtained with less precipitant and adsorbant than is required by any recovery process hitherto known. A still further object is to provide adjuvants to be added to the harvested streptomycin-containing fermentation broths which facilitate recovery of streptomycin and which materially increase the yield and improve the quality obtained from fermentation broths by known recovery processes. Further objects will appear hereinafter.

It has now been found that these objects are accomplished and the aforementioned disadvantages are overcome by the addition of a positive ion sequestering agent to an aqueous solution of a nitrogen basic antibiotic which also contains multivalent metallic ions as in harvested fermentation broth. By this process the yield of antibiotic e. g. streptomycin from a harvested fermentation broth containing the elaboration products of Actinomyces griseus is substantially increased and the antibiotic activity of the streptomycin so obtained is greater than that obtained in the absence of such sequestering agents.

In this application the term "sequestration" and "sequestering agent" are employed in the same sense as that in Journal of Chemistry Education, vol. 25, page 482 (1948). The most useful sequestering agents are the salts of weakly ionizable polybasic acid compounds. Of these the water-soluble polyphosphate salts are particularly advantageous in the process of this invention when added to harvested fermentation broth prior to the employment of the customary recovery and purification procedures.

In one method of practicing the process of the present invention, harvested streptomycin fermentation broth is filtered, and then a water-soluble polyphosphate adjuvant, such as sodium tetraphosphate ($Na_6P_4O_{13}$) is added. When, for example, the sodium salt of an azosulfonic acid dye, e. g. orange II (beta-naphtholazobenzene p-sulfonic acid), is added to this treated solution in order to precipitate the streptomycin, the following facts are observed in contrast to liquors with no treatment: (1) less dye salt is needed, (2) the precipitate is more readily filtered, (3) higher yields are obtained on recovering the antibiotic from its dye salt, and (4) further purifications are considerably simplified.

Similarly, when the filtered streptomycin-containing broths are to be processed by adsorption on a cation-exchange resin, it has been found that the addition of a sequestering agent e. g. sodium tetraphosphate, prior to adsorption on the exchanger allows the use of smaller quantities of resin than would normally be possible. Furthermore, when this resin is to be used by passing the filtered fermentation broth through a bed or column of the resin, the untreated broth tends to coat the resin with a slimy deposit that may make further passage of broth through the tower impractical. This effect is not encountered in broths to which the sequestering agent has been added.

The recovery of streptomycin from fermentation broth, by means of this invention, may be carried out as follows: The harvested streptomycin broth, filtered free of mycelium and adjusted to about pH 3.5 is treated with a solid sodium or other water-soluble polyphosphate, e. g. sodium tetraphosphate, and then the solution is neutralized with aqueous sodium hydroxide to about pH 7.5. The clear solution is passed through a column containing a carboxylic type of cation-exchange resin on the sodium cycle. The effluent from the column is discarded. The adsorbed streptomycin is eluted from the column with dilute hydrochloric acid, and is obtained in a partially purified form from the eluate. Alternatively, the streptomycin in the eluate can be further purified by any of several known procedures. Besides removing undesirable organic impurities, the practice of this invention leaves most of the undesirable inorganic ions, such as calcium, in the effluent from the adsorption and reduces the precipitation of these inorganic salts during the further purification procedures.

The invention is further illustrated by the following examples:

*Example 1*

(a) About 450 gallons of streptomycin fermentation broth, filtered free of mycelium and adjusted to pH 3.0, is treated with about 27 pounds of sodium tetraphosphate and then adjusted to pH 7.5 with aqueous sodium hydroxide. This solution, assaying about 410 $\gamma$/mg. is pumped downward through a column about 12 feet high and 4 inches in diameter packed with 10.8 pounds of a carboxylic acid type cation-exchange resin (Amberlite IRC-50) at a rate of about 1.2 gallons per minute. The effluent from the column is biologically assayed periodically. The broth feed is followed by a water wash, which is discarded, and then the adsorbed streptomycin is eluted from the column with dilute hydrochloric acid and further purified.

(b) About 450 gallons of streptomycin fermentation broth similar to that in Example 1(a) is processed as described in Example 1(a) except that no sodium tetraphosphate is added.

It is noted that the capacity of the resin under these conditions, as shown by the "breakthrough" point of the resin, is considerably less than in Example 1(a). This is shown in the following table:

| Effluent Vol. (gallons) | $\gamma$/ml. in Effluent | |
|---|---|---|
| | Example 1(a) | Example 1(b) |
| 100 | 10 | 10 |
| 150 | 12 | 35 |
| 200 | 15 | 75 |
| 250 | 20 | 125 |
| 300 | 25 | 160 |
| 400 | 45 | 215 |

Furthermore, it is noted that the overall recovery from broth to eluate in Example 1(a) is about 86% while in the absence of sodium tetraphosphate the overall yield for these steps is about 78%.

Similar improvements may be noted by substituting for sodium tetraphosphate in the above example sodium hexametaphosphate, potassium tetraphosphate and related water-soluble phosphates.

*Example 2*

Four portions of filtered fermentation broth (about 2000 ml. per portion) adjusted to pH 5.5 are treated respectively with 0, 3, 6 and 10 grams of sodium tetraphosphate. To each solution is then added 6 grams of orange II dye (sodium salt of beta-naphthol p-sulfonic acid), and then the mixture is stirred and filtered. The precipitated streptomycin-orange II salt is suspended in 220 ml. of 90% methanol-10% water solution containing 1 gram of barium chloride, and this mixture is stirred in order to convert the streptomycin to the methanol soluble streptomycin trihydrochloride and form the insoluble barium salt of orange II. Any calcium orange II salt present in the original precipitate is converted by this treatment to methanol-soluble calcium chloride. The solutions are filtered, and the filtrate is analyzed for calcium with results as shown.

| Grams Sodium Tetraphosphate Added to Original Solution | Grams Calcium/ 100 ml. Methanol Solution |
|---|---|
| 0 | 0.13 |
| 3 | 0.10 |
| 6 | 0.008 |
| 10 | 0.002 |

*Example 3*

(a) About 1900 ml. of harvested streptomycin broth assaying about 459 γ/ml. is adjusted to pH 3.5 and filtered. To the filtrate adjusted with sodium hydroxide to pH 5.5 is added 6 grams of orange II dye. The mixture is stirred for about half an hour, and then the precipitated streptomycin-orange II salt is filtered. The filtrate which is found to assay about 40 γ/ml. is discarded. The precipitate is suspended in 200 ml. of methanol containing 1.2 grams of barium chloride, stirred for half an hour, and then filtered. The filtrate is found to contain about 707,000 γ of streptomycin for a step yield from dye to methanolic streptomycin solution of 87%.

(b) About 1900 ml. of the same harvested streptomycin broth, as in Example 3(a), is adjusted to pH 3.5, 10 grams of sodium tripolyphosphate is added, and the mixture is filtered to remove the mycelium. To the filtrate, adjusted with sodium hydroxide to pH 5.5, is added 6 grams of orange II dye. The mixture is stirred for about half an hour, and then the precipitated streptomycin-orange II salt is filtered. The filtrate, which is found to assay about 16 γ/ml., is discarded. The precipitate is suspended in 200 ml. of methanol containing 1.2 grams of barium chloride, stirred for half an hour, and then filtered. The filtrate is found to contain about 827,000 γ of streptomycin for a step yield from dye to methanolic solution of about 98%.

*Example 4*

Four portions of filtered fermentation broth (about 2000 ml. per portion) adjusted to pH 5.5 are treated respectively with 0, 2, 10 and 20 ml. of a "sequestering" agent whose major ingredient is a polyamino carboxylic acid salt, formulated as:

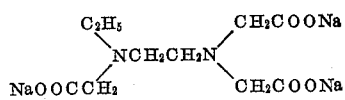

To each solution is then added 6 grams of orange II dye and then the mixture is stirred and filtered. The precipitated streptomycin-orange II salt is suspended in 220 ml. of 90% methanol-10% water solution containing 1 gram of barium chloride, and this mixture is stirred in order to convert the streptomycin to the methanol soluble streptomycin trihydrochloride and form the insoluble barium salt of orange II. Any calcium orange II salt present in the original precipitate is converted by this treatment to methanol soluble calcium chloride. The solutions are filtered, and the filtrate is analyzed for calcium with results as shown.

| Ml. of "Sequestering" Agent Added to Original Broth | Grams Calcium/100 ml. Methanol Solution |
|---|---|
| 0 | 0.13 |
| 2 | 0.009 |
| 10 | 0.003 |
| 20 | 0.003 |

The sequestering agents useful in this invention are those compounds which will reduce the concentration of a multivalent positive ion in aqueous solution to the extent that the remaining concentration of the multivalent positive ion is insufficient to be precipitated by a given negative ion which with it has a low solubility product constant. Included among the sequestering agents which can be employed are the salts of weakly ionizable polybasic acidic compounds e. g. the alkali metal poly-phosphates, the alkali metal polysulfonates, the alkali metal and ammonium salts of polycarboxylic acids. Among the specific compounds of this group which can be used are sodium tetraphosphate, potassium tetraphosphate, sodium hexametaphosphate, sodium potassium and ammonium citrate, the sodium salt of ethylene-diamine tetraacetic acid and alkali metal salts of ethylene-diamine poly-alkyl carboxylic acids, in particular N-alkyl ethylenediamine-N-N',N'-triacetic acid. Other sequestering agents include the polyphenols e. g. catechol, resorcinol; water-soluble ion exchange resins and hydrophilic chelating agents. Among the latter agents are p-nitrobenzenediazoaminoazobenzene, sodium 1,8-dihydroxynaphthalene-3,6-disulphonate, 2,2'-dipyridyl, sodium 1-nitroso-2-naphthol-3,6 - disulphonate, 0 - phenanthroline, tetrahydroxyanthraquinone, thioglycollic acid and thiourea.

The sequestering agents which can be employed in this invention are therefore materials capable of converting various divalent and trivalent metallic ions to a deionized water-soluble form. It is believed that these sequestering agents react with the calcium ions and other impurities in harvested fermentation broth to remove said ions and impurities effectively from the streptomycin-containing solutions and render them unavailable for further chemical reaction. At the same time the streptomycin is not affected by the added materials and can be subsequently isolated and purified by suitable methods.

As a general rule the amount of sequestering agent employed may vary between 5 grams and 25 grams per liter of solution containing the nitrogen basic antibiotic. Amounts less than 5 grams per liter are ordinarily insufficient to eliminate the undesirable impurities in the further processing of the fermentation broth. Amounts greater than 25 grams of the sequestering agent per liter of the solution, although not harmful to the process are uneconomical.

The aqueous solution of the nitrogen basic antibiotic is preferably adjusted to a pH of 2.5 to 5.5 before adding the sequestering agent. However, any pH at which the antibiotic is sufficiently stable may advantageously be employed.

In a preferred embodiment of the invention the water-soluble sodium polyphosphate e. g. sodium tetraphosphate is added in an amount of about 7 grams per liter to a streptomycin-containing fermentation broth either before or after filtration to remove the mycelium. Different types of fermentation broths may contain varying amounts of organic and inorganic impurities which are held in solution by the added sodium or other water-soluble polyphosphate. Therefore, by the use of these sequestering agents in accordance with the process of this invention, it has been found that considerable amounts of inorganic salts, such as calcium salts as well as some organic impurities that may otherwise contaminate the streptomycin even after subsequent purification processes will remain in solution and can be discarded in the spent liquors. The sequestering agents also permit better filtration and washing of the dye cake in a dye precipitation process, and they also permit higher streptomycin concentration in the eluate formed in a resin absorption process.

Although the sequestering agent e. g. sodium polyphosphate is generally added to the fermentation broth before removing the mycelium by a filtration method, satisfactory results are obtained if the sequestering agent is added at any time prior to the addition of a streptomycin precipitant or to the adsorption of the streptomycin on a resin. Also, it is feasible to proceed with a partial purification of the streptomycin before employing the process of this invention. For example, the filtered streptomycin-containing broth may be adsorbed on activated carbon and then eluted with suitable eluent, such as dilute acid. This solution may then be treated with a sequestering agent before proceeding with further purification of the antibiotic.

The process of this invention has been particularly described in terms of streptomycin. It is to be understood, however, that this invention may be applied to the purification of nitrogen basic antibiotics other than streptomycin. Examples of such materials are streptothricin, gramicidin, tyrocidin, neomycin, chloramphenicol and other related members derived from microorganisms of the actinomycetes family.

As many widely different embodiments of this invention may be made without departing from the spirit and scope hereof, it is to be understood that this invention is not limited to the specific embodiments hereof, except as defined in the appended claims.

We claim:

1. In an improved method for the recovery of a nitrogen basic antibiotic from streptomyces formentation broth containing multivalent metallic ions, the step which comprises adding a sequestering agent which forms complexes with calcium to the broth prior to the isolation of the nitrogen basic antibiotic.

2. In an improved process for the recovery of streptomycin from harvested streptomycin-containing fermentation broth also containing multivalent metallic ions, the step which comprises adding a water-soluble polyphosphate to the broth prior to the isolation of the streptomycin.

3. In an improved process for the recovery of streptomycin from harvested streptomycin-containing fermentation broth also containing multivalent metallic ions, the step which comprises adding to the broth, prior to the isolation of the streptomycin from 5 to 25 gms. of a sodium polyphosphate per 1,000 cc. of fermentation broth.

4. The process of claim 2 in which the water-soluble polyphosphate is sodium tetraphosphate.

5. The process of claim 3 in which the sodium polyphosphate is sodium tetraphosphate.

6. In an improved method for the recovery of a nitrogen basic antibiotic from streptomyces fermentation broth containing multivalent metallic ions, the step which comprises adding salts of weakly ionizable polybasic acid compounds to the broth prior to the isolation of the nitrogen basic antibiotic.

JOHN J. GOETT.
STANLEY W. ENSMINGER.

References Cited in the file of this patent

UNITED STATES PATENTS

| Number | Name | Date |
| --- | --- | --- |
| 2,541,420 | Howe et al. | Feb. 13, 1951 |

OTHER REFERENCES

Geiger et al., Proc. Soc. Exptl Biol. Med. V. 61 (1946), pp. 190–191.